Figure 1:
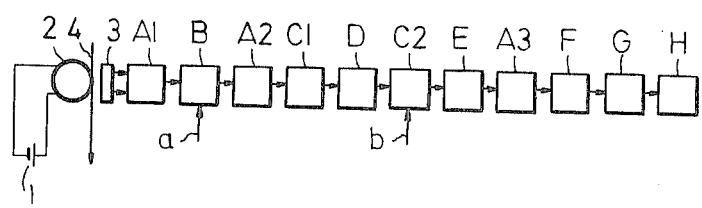

United States Patent

[11] 3,601,615

[72] Inventor Seizi Maeda
 5-19 Kida-cho, Neyagawa-shi, Osaka, Japan
[21] Appl. No. 865,072
[22] Filed Oct. 9, 1969
[45] Patented Aug. 24, 1971

[54] ELECTRIC APPARATUS FOR DETECTING MINUTE VARIATION IN TIME-FUNCTIONAL LUMINOUS ENERGY
3 Claims, 11 Drawing Figs.

[52] U.S. Cl. ..................................... 250/214 R, 250/219 DF
[51] Int. Cl. ..................................... H01j 39/12
[50] Field of Search ........................................... 250/219 DF, 219 TH, 219 WD, 219 LG, 206, 214; 356/237, 159–161, 167

[56] References Cited
UNITED STATES PATENTS
| | | | |
|---|---|---|---|
| 2,978,636 | 4/1961 | Fountain | 250/219 |
| 3,340,400 | 9/1967 | Quittner | 250/219 |
| 3,436,556 | 4/1969 | McCartney | 356/237 |

Primary Examiner—Walter Stolwein
Attorneys—Robert E. Burns and Emmanuel J. Lobato ABSTRACT: Time-functional variations in the thickness of a lengthwisely advancing linear article are photoelectrically sensed in succession and converted into an electrical signal for actuating a terminal mechanical means operative for the article's advancing system, which signal is passed through a system substantially including a differential amplifier, a waveform converter, an integrator, a differentiator and a monostable circuit, connected in this order. The resultant electrical signal may be negatively fed back for control of the luminous source for better stabilization of an amplifier circuit.

ELECTRIC APPARATUS FOR DETECTING MINUTE VARIATION IN TIME-FUNCTIONAL LUMINOUS ENERGY

The present invention relates to an electric apparatus for detecting minute variations in time-functional luminous energy, and, more particularly, it relates to an electric apparatus for sensitively detecting variations in magnitude and sustained duration of luminous energy so as to emit a corresponding alarm.

Although, various attempts have been proposed concerning the electric apparatus of the above described function, none of those attempts have been successful because of their functional shortcomings. For example, in some of the aforesaid electric apparatuses, an input wave signal is differentiated so as to acquire a corresponding output by an AC amplifier circuit. In this system, because of insufficient operation of the amplifier circuit, it is almost impossible to detect a long period variation of the luminous energy and the differentiated waveform is not suitable for measurement of the variation's duration.

A principal object of the present invention is to provide an electric apparatus for sensitively detecting variations in the magnitude and sustained duration of luminous energy while effectively eliminating the inherent drawbacks of such conventional apparatuses.

In the art of the present invention, the aforesaid object is achieved by detecting a time-functional variation of luminous energy by a photoelectric cell, comparing this variation with a given reference input by means of a differential circuit so as to emit a corresponding output signal, converting this output signal into a corresponding square-wave signal by a waveform converter circuit, integrating the square-wave signal into a corresponding triangular-wave signal by an integration circuit, again converting this triangular-wave signal into a corresponding square-wave signal, supplying the resultant differentiated signal to a monostable circuit, and actuating a terminal mechanical means in response to the output of the monostable circuit.

The apparatus of the present invention is advantageously usable for a rewinding system of a textile fibrous bundle. By exposing the processing fibrous bundle to luminous radiation, time functional variations in the luminous energy, caused by a lengthwise irregularity of the processing fibrous bundle are sensed by the photoelectric cell disposed facing a luminous source spacedly sandwiching the passing fibrous bundle. Upon detection of a lengthwise irregularity of the fibrous bundle, a terminal mechanical means is actuated to sever the processing fibrous bundle. Variations in magnitude of the luminous energy can be successively, reliably, and precisely detected together with the durations of such variations.

Figure 4:
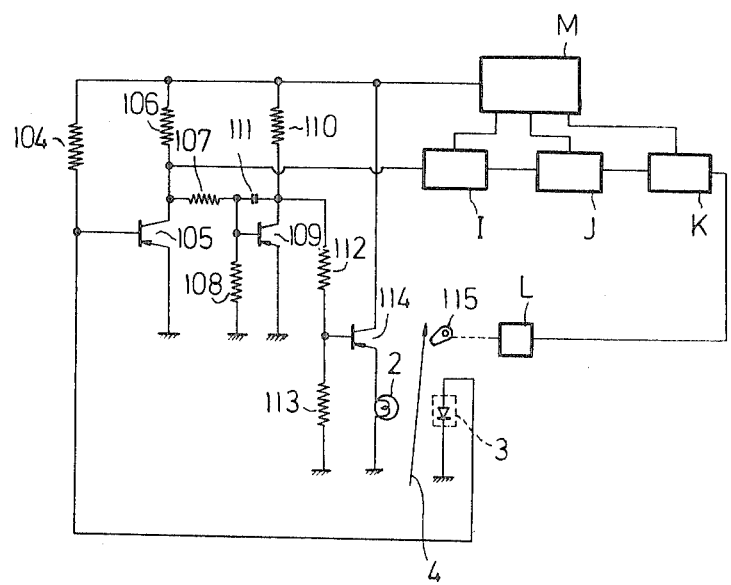
Figure 2:
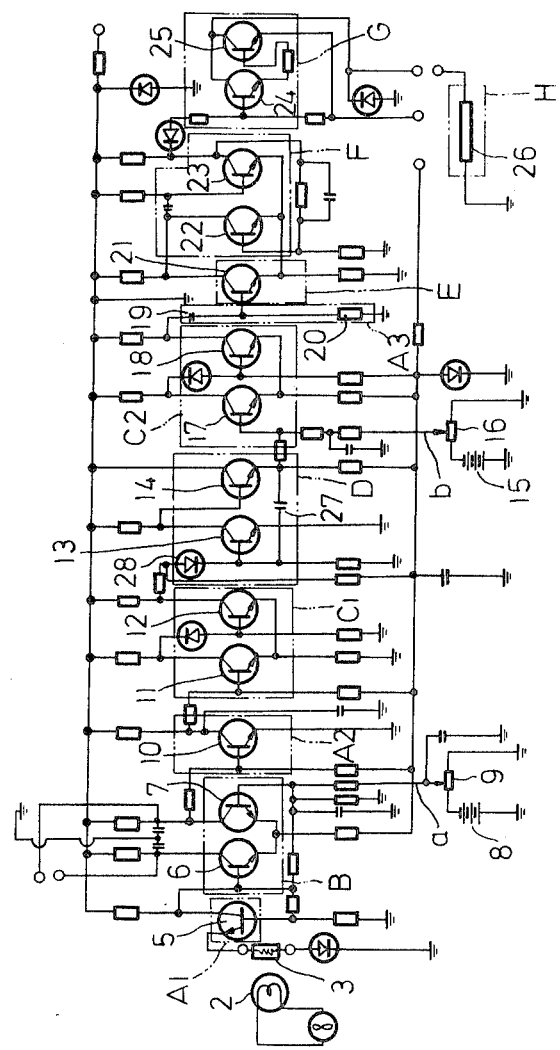

Further features and advantage of the art of the present invention will be more apparent from the ensuing description, reference being made to the accompanying drawings, wherein:

FIG. 1 is a block diagram for showing a typical embodiment of the electric apparatus of the present invention, FIG. 2 shows a detailed circuit connection of the electric apparatus shown in FIG. 1, FIGS. 3A to 3H are explanatory drawings for showing waveforms of signals picked up at positions in the diagram shown in FIG. 1, FIG. 4 is an explanatory drawing for showing a circuit connection of an improved modification of the electric apparatus shown in FIG. 1.

In the electric apparatus shown in FIG. 1, a luminous source, that is, a lamp 2 is connected to an electric source 1 and faces a photoelectric cell 3 in a closely spaced relationship so that luminous radiation by the lamp 2 is accepted by the photoelectric cell 3. Through the space between the facing lamp 2 and the photoelectric cell 3, a linear article 4, such as a textile fibrous bundle having a lengthwise-varying thickness, is processed in a direction shown with an arrow in the drawing. During this passage, the linear article 4 is exposed to the luminous radiation by the lamp 2 and, therefore, the luminous energy to be received by the photoelectric cell 4 varies in accordance with the lengthwise variation of the thickness of the processed linear article 4. This time-functional variation in the thickness of the linear article 4 is detected by the photoelectric cell 3 which emits a D THE LINEAR ARTICLE $ IS DETECTED BY THE PHOTOELECTRIC CELL 0 WHICH EMITS A DC-current output signal varying time-functionally in accordance with the lengthwise variation in the thickness of the successively processed linear article 4. The DC-current output signal, obtained in this manner, is proportional to the time-functional change in the thickness of the linear article 4. Passing through the first DC-amplifier circuit $A_1$, this DC-current output signal is amplified and applied to a differential circuit B connected to the first DC-amplifier circuit $A_1$ applied thereto. The differential circuit B generates an output voltage signal only when a difference is detected between the applied DC signal and the given reference voltage "$a$." The DC signal may be larger than the preset reference voltage "$a$" in some cases, while the former may be smaller than the latter in another case. In any event, a difference between the two effects the generation of the output voltage signal of the differential circuit B. Passing through the second DC-amplifier circuit $A_2$ connected to the differential circuit B, the amplified output voltage signal is then supplied to the first waveform converter circuit $C_1$ utilizing a Schmitt trigger circuit. Upon receipt of this amplified output voltage signal, the first waveform converter circuit $C_1$ generates a square wave output signal, whose duration corresponds to the length of the time wherein the aforesaid difference between the DC-output signal of the first DC-amplifier circuit $A_1$ and the preset reference voltage "$a$" exists, that is, the length of the time wherein the differential circuit B generates the output voltage signal.

The suare-wave output signal from the circuit C, is then advanced into an integration circuit D having an integration time constant, and is converted into a triangular-wave output signal. In this connection, the height of each triangular-waveform corresponds to the length of the time during which the abnormally large diametral portions of the linear article 4 pass through the exposure to the luminous radiation in between the lamp 2 and the photoelectric cell 3. Next, the triangular-wave output signal of the integration circuit D is transmitted to the second waveform converter circuit $C_2$ for comparison with a second reference voltage "$b$" also applied thereto. By this comparison, the second waveform converter circuit $C_2$ emits a square-wave output signal exceeds the level of the preset reference voltage "$b$." The square-wave output signal from circuit $C_2$ is differentiated by a differentiation circuit E connected to the second waveform converter circuit $C_2$, and is then amplified by the third amplifier circuit $A_3$ connected to the differentiation circuit E and advanced into a monostable circuit F holds the received differentiated and amplified signal for a preset period so as to provide a preset period of electric power necessary for actuating a terminal magnet H by way of a power amplifier circuit G.

A detailed mode of the signal transmission in the above-described electric arrangement will now be more clearly described in conjunction with the illustrations in FIGS. 2, and 3A to 3H.

Figure 3A:
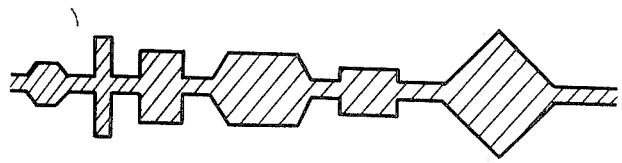
Figure 3B:
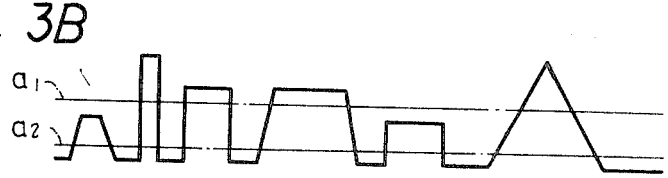

When a linear article 1 having a lengthwise variation of its size as shown in FIG. 3A is processed through the space between the lamp 2 and the photoelectric cell 3, the photoelectric cell 3 generates an output electrical signal (either current or voltage) represented by a waveform shown in FIG. 3B, and this output signal is next amplified by a transistor 5 of the first amplifier circuit $A_1$. The amplified output signal of this transistor 5 is applied to a base of a transistor 6 of the differential circuit B having transistors 6 and 7. The first reference voltage "$a$" is applied to a base of the transistor 7, so that the amplified output signal applied to the base of the transistor 6 is compared with this preset reference voltage "a." Only when there exists a difference between the magnitudes of the two, does the transistor 7 emit an output voltage signal. The level of the preset first reference voltage can be selected as desired by suitably adjusting the resistance of a variable resistor 9 connected to an electric source 8. In the drawing, two examples "$a_1$" and "$a_2$" of the selected reference voltage are illustrated.

Figure 3C:
Figure 3D:
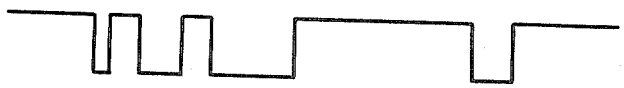
Figure 3E:
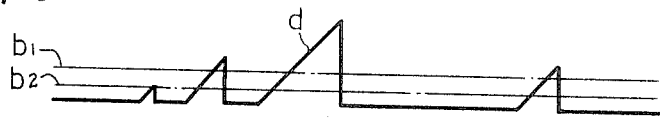

In the case where the reference voltage "$a_1$" is selected, an output voltage signal having a waveform shown in FIG. 3C is emitted at a collector of the transistor and is amplified by passing through the second amplifier circuit $A_2$. The corresponding amplified output voltage signal of a transistor 10 of the second amplifier circuit $A_2$ is applied to the first waveform converter circuit $C_1$, which includes transistors 11 and 12, and a square-wave output signal as shown in FIG. 3D is obtained. In the present embodiment, the polarity of the input signal is reversed in the output signal of the circuit for the operational convenience in the following integration. The square-wave output signal of the first waveform converter circuit $C_1$ is then supplied to the subsequent integration circuit D having transistors 13 and 14 for integration. The corresponding triangular-wave output signal of the integration circuit D is as shown in FIG. 3E.

The operational principle of this integration circuit D is as follows. When the polarity of the collector signal of the transistor 12 is maintained positive, and the transistor 12 does not generate any output pulse, the polarity of the base of the transistor 13 becomes positive in accordance with the polarity of a diode 28 inserted into the base circuit of the transistor 13, and an electric current flows through the transistor 13 but not through the transistor 14. Therefore, the polarity of the emitter of transistor 14 becomes negative and a capacitor 27 is negatively charged. Instantly, when a signal pulse of negative polarity is generated by the transistor, the polarity of the base of the transistor 13 is changed to negative by the action of the diode 28 and current flows through the transistor 14 but not through the transistor 13. By this initiation of current flow, the polarity of the emitter of transistor 14 becomes positive and the capacitor 27 is positively charged. In case the negative pulse of the transistor 12 does not exist, such as when current flows through both diode 28 and the transistor 13, current flow to the transistor 14 is stopped and the capacitor 27 is instantly charged negatively. Therefore, length of the slope "$d$" of the triangular waveform shown in FIG. 3E can be changed through adjustment of the capacitance value of the capacitor 27. The capacitor 27 is charged during a period corresponding to the duration time of the square-wave output signal shown in FIG. 3D. Consequently, it is concluded that height of the triangular-wave form can be adjusted through the above-escribed operations.

Figure 3F:
Figure 3G:
Figure 3H:

Next, the triangular-wave output signal of the emitter of the transistor 14 is compared with the preset second voltage "$b$," and only when the output signal exceeds the reference voltage, these exceeding portions of the output signal are fed to the second waveform converter circuit $C_2$ for conversion into a square-wave output signal shown in FIG. 3F. The magnitude of the reference voltage "$b$" can be set as desired by adjusting the resistance of a resistor 16 connected to an electric source 15. For example, two levels $b_1$ and $b_2$ of the reference voltage "$b$" are illustrated in FIG. 3E. In a manner as is above-described, the integration circuit operates to filter the output signal corresponding to the lengthwise irregularity of the processed linear article with respect to the duration time thereof. The second waveform converter circuit $C_2$ includes transistors 17 and 18 and the square wave as shown in FIG. 3F is obtained at a collector of the transistor 18. Next, this square-wave output signal is differentiated into a differentiated output signal shown in FIG. 3G by the differentiation circuit E including a capacitor 19 and a resistor 20. Only positive pulses of this differentiated output signal are amplified by the third amplifier circuit $A_3$ including a transistor 21 and applied to the following monostable circuit F. This monostable circuit F includes transistors 22 and 23 and holds each amplified and differentiated output signal of the amplifier circuit $A_3$ for a constant period so as to generate an electric current for actuating the terminal magnet H, as shown in FIG. 3H. Being disposed between the monostable circuit F and the terminal magnet H, the power amplifier circuit G including transistors 24 and 25 is inserted for producing a power large enough to actuate the terminal magnet H.

In the above-described construction, various types of DC-amplifiers, such as a differential amplifier circuit, can replace the amplifier circuits $A_1$ and $A_2$. Furthermore, various types of amplitude comparator circuits may be used for the differential circuit B. The integration circuit D can take various forms, such as, for example, the form of a bootstrap circuit. Both the monostable circuit F and the power amplifier circuit G can comprise, for example, an SCR circuit.

A improved modification of the apparatus shown in FIGS. 1 and 2 is shown in FIG. 4. In this embodiment, the output signal of the amplifier part is partly subjected to a negative feedback to the luminous source, so that the lamp and drifting outputs of the lamp, photoelectric cell and the amplifier circuit are well compensated for by this negative feedback. Together with this compensation of the drifting outputs, even an irregularity of the processed linear article of a relatively long period but of relatively small magnitude can be sensed exactly without any failure.

In the illustrated arrangement of the present embodiment, the linear article 4 having lengthwise irregularity is advanced through a space between the lamp 2 and the photoelectric cell 3. The base of a transistor 105 is directly connected to the photoelectric cell 3 and an output voltage of the photoelectric cell 3 is amplified by the transistor 105 for generating an output voltage across a resistor 106 connected to the collector of the transistor 105. A resistor 104 is also connected to the base of the transistor 105 for providing the transistor 105 with a bias voltage. The above-described amplified output voltage is divided into voltages across resistors 107 and 108, connected to the collector of the transistor 105 in series, and again amplified by a transistor 109 connected to the transistor 105 for generating a voltage across a resistor 110 connected to a collector of the transistor 109. In this generating operation, because a negative feedback is formed from the collector to the base of the transistor 109 by way of a capacitor 111 of large capacity, the resulting output voltage across the resistor 110 is provided with a very gentle fluctuation, which is almost similar to a DC voltage, and no drifting output voltage is generated. If the capacitor 111 is omitted, the output voltage of the photoelectric cell 3 is fed back negatively after amplification by the transistors 105, 109 and 114. Because of this negative feedback, the luminous energy of the lamp 2 would increase the magnitude of the luminous energy received due to a photoelectric cell signal decrease and the lengthwise irregularity of the processed linear article 4 would not be sensed reliably.

The electric voltage generated across the resistor 110 is divided into voltages across resistors 112 and 113 connected to the collector of the transistor 109. This divided voltage is again amplified by a transistor 114 for controlling the luminous energy of the lamp 2. Beside this luminous energy control, the voltage generated across the resistor 106 is again divided, amplified by an amplifier circuit I of any known type, and processed through a switching circuit J and a relay circuit K for controlling a terminal magnet L. In the embodiment shown in the drawing, a cutter 115 for severing the processed linear article 4 is operated by the terminal magnet L. An electric source M is connected to the circuit as a source of power for enabling the generation of the various signals.

As mentioned above, the electric apparatus of the present invention is capable of sensitively detecting lengthwise dimensional irregularities of a successively processed linear article together with duration periods of the irregularity and, therefore, is particularly and advantageously usable for detection and elimination of textile yarn defects such as slubs. The insertion of the negative feedback circuit assures further reliable and successful detection of such irregularities.

What I claim is:

1. An electric apparatus for detecting a minute time-functional variation of luminous energy comprising (a) a source of luminous energy, (b) photoelectric cell means disposed facing said luminous source in a slightly spaced relationship therewith for allowing the insertion of a linear article for advancement longitudinally therebetween, said photoelectric cell means being for generating an electric output signal corresponding to a lengthwise dimensional irregularity of said linear article, (c) a differential circuit having an output terminal and first and second input terminal means, said first input terminal means being connected to said photoelectric cell and said second input terminal means being for connection to a first reference signal, and said differential circuit having means for comparing said electric output signal of said photoelectric cell with said first reference signal to produce a differential output signal at said output terminal, (d) first waveform converter circuit means connected to said differential circuit output terminal for converting said output signal of said differential circuit into a corresponding first square-wave output signal, (e) an integrating circuit connected to said first waveform converter circuit means for receiving and integrating said square-wave output signal to produce a triangular-wave output signal, (f) second waveform converter circuit means connected to said integrating circuit and including means for comparing said triangular-wave output signal with a second reference signal for producing a second square-wave output signal in response to said comparison, (g) a differentiating circuit connected to said second waveform converter circuit for differentiating said square-wave output signal into a corresponding differentiated output signal, (h) a monostable multivibrator circuit connected to said differentiating circuit for producing a corresponding output signal and (i) mechanical means having electrical actuating means connected to said monostable circuit for controlling said advance of said linear article upon receipt of said output signal of said monostable circuit.

2. An electric apparatus as claimed in claim 4, further comprising first, second, third and fourth amplifier circuit means inserted respectively between said photoelectric cell and said differential circuit, between said differential circuit and said first waveform converter circuit means, between said differentiation circuit and said monostable circuit, and between said monostable circuit and said mechanical means.

3. An electric apparatus as claimed in claim 4, further characterized in that said luminous source is provided with a negative feedback circuit comprising (a) a first transistor having a base electrode connected to said photoelectric cell, (b) a second transistor having a base electrode connected to a collector electrode of said first transistor, (c) a third transistor having a base electrode connected to a collector electrode of said second transistor and an emitter electrode connected to said luminous source, (d) and a capacitor of large capacity inserted between said base and collector electrodes of said second transistor.